United States Patent [19]

Palmer

[11] Patent Number: 4,801,183
[45] Date of Patent: Jan. 31, 1989

[54] INFRA-RED OPTICAL SYSTEMS

[75] Inventor: John M. Palmer, North Wales, United Kingdom

[73] Assignee: Pilkington P.E. Limited, St. Helens, England

[21] Appl. No.: 760,489

[22] Filed: Jul. 30, 1985

[30] Foreign Application Priority Data

Aug. 7, 1984 [GB] United Kingdom ................ 8420070

[51] Int. Cl.$^4$ ............................................. G02B 13/14
[52] U.S. Cl. ...................................... 350/1.2; 350/447
[58] Field of Search ........................... 350/1.1, 1.2, 447

[56] References Cited

U.S. PATENT DOCUMENTS

| | | | |
|---|---|---|---|
| 2,896,499 | 7/1959 | DeLang | 350/447 |
| 4,541,688 | 9/1985 | Watt et al. | 350/1.1 |
| 4,621,888 | 11/1986 | Crossland et al. | 350/1.2 |

OTHER PUBLICATIONS

Jenkins, F. A. et al, *Fundamental of Optics*, Third Ed. McGraw-Hill, N.Y., 1957, p. 20.
Smith, W. J., *Modern Optical Engineering*, McGraw-Hill, N.Y., pp. 82–84.

*Primary Examiner*—Bruce Y. Arnold
*Attorney, Agent, or Firm*—F. Eugene Davis, IV

[57] ABSTRACT

An infra-red optical system, such as an afocal telescope, having a beam-splitter plate located in a beam position having one valve of numerical aperture and tilted with respect to the optical axis has a single compensating plate located in a beam position having a different value of numerical aperture and tilted differently with respect to the optical axis so as to compensate for aberrations introduced by the tilted beam-splitter plate. The beam-splitter and compensating plates are preferably tilted about respective first and second axes orthogonal to the optical axis and lying on mutually orthogonal planes.

9 Claims, 3 Drawing Sheets

INFRA-RED OPTICAL SYSTEMS

BACKGROUND OF THE INVENTION

This invention concerns improvements in or relating to infra-red optical systems.

There are a number of situations where an optical beam is required to pass through an aperture or to be reflected by a mirror surface and then divided to enter two separate detector channels. There are also some situations where it is required to combine two entrance beams to travel to a common detector. In each case a beam dividing or combining device is required, commonly referred to as a beam-splitter.

A beam-splitter may have a surface coating which is partially reflective, e.g. is wavelength selective in its reflection/transmission characteristics so that a chosen part of the incident waveband is strongly reflected while the rest of the waveband is transmitted. Such surface coating requires a supporting substrate and this can give rise to problems.

Beam-splitters are fairly commonly used for the visual waveband and can take a number of forms. One of the simplest is a parallel faced plate which carries the partially reflective coating. The plate is tilted at an appropriate angle to the entrance beam and the geometry of the optical system arranged around the resulting reflected and transmitted beams. This may be generally satisfactory if the light beam incident on the plate is collimated but if it is not, e.g. if the light beam is already inside the optical system and converging towards an intermediate image, then the tilted plate will introduce asymmetric aberration. The magnitude is generally dependent on the numerical aperture of the beam and the thickness of the plate and in some circumstances these may be kept sufficiently small for the introduced error to be tolerable, but in others they may not. Thinning of the plate can lead to further problems. A pellicle, which can be considered as an example of a very thin plate, needs to be isolated from vibration to operate satisfactorily and so has limited applications.

In view of these problems with a simple plate-like device, the beam-splitter arrangement frequently adopted for the visible waveband is a parallel sided block which is introduced into the beam with its faces orthogonal to the optical axis and which has an internal face, inclined to the optical axis, which carries the partially reflective coating. The prism components of the block are cemented together so that the beam transmitted through the partially reflecting internal interface effectively encounters a simple parallel sided block. The internally reflected optical axis is arranged to pass normally through the relevant exit face so that the reflected beam also, in effect, encounters a simple parallel sided block. The block may be cubic in form and is sometimes referred to as a beam-splitting cube.

Difficulties arise with beam-splitting cubes for infra-red radiation primarily because of the properties of infra-red transmitting optical materials. Firstly, the large physical size of typical infra-red optical systems tends to lead to long optical path lengths, which usually implies serious losses by absorption, as well as the considerable volume and mass leading to high cost and excessive weight. Secondly, infra-red materials generally have relatively high values of refractive index, say between 2 and 4, so the index of the material at the coated interface must be sufficiently large to prevent total internal reflection occurring there. In visual systems the visible light transmitting materials have lower refractive index values and the prism components are cemented together to form the block or cube, but there are difficulties in finding suitable infra-red cements. It will thus be seen that beam-splitting in infra-red optical systems presents problems which cannot generally be solved by simply adopting the solutions of visible light systems.

SUMMARY OF THE INVENTION

According to the present invention there is provided an infra-red optical system having a beam-splitter plate tilted with respect to the optical axis of the system and further having a compensating plate tilted with respect to the optical axis of the system differently from the beam-splitter plate in a manner such as to compensate at least partially for aberration introduced by the tilted beam-splitter plate.

Specifically, the beam-splitter plate may be inclined with respect to the optical axis about a first axis orthogonal to the optical axis, and the compensating plate may be inclined with respect to the optical axis about a second axis orthogonal to the optical axis and lying in a plane orthogonal to said first axis. The angle of tilt or inclination of the beam-splitter plate with respect to the optical axis may be different from the angle of tilt or inclination of the compensating plate with respect to the optical axis.

The optical system may be an afocal telescope and the beam-splitter plate may be located behind the front lens element of the objective lens, for example between lens elements of the objective lens, and the compensating plate may be located at the back of the objective lens. The terms 'front' and 'back' are used herein in the sense that the front of the optical system faces towards the source of infra-red radiation received by the system. One or more lens elements of the system, whose refracting surfaces are preferably all of spherical curvature, may be decentred to assist with the compensation.

BRIEF DESCRIPTION OF THE DRAWINGS

In order that the invention may be better understood reference will now be made to the accompanying drawings which schematically represent, by way of example, an embodiment of infra-red optical system in accordance with the invention in the form of an infra-red afocal telescope. In the drawings.

DESCRIPTION OF THE PREFERRED EMBODIMENT

Figure 1:
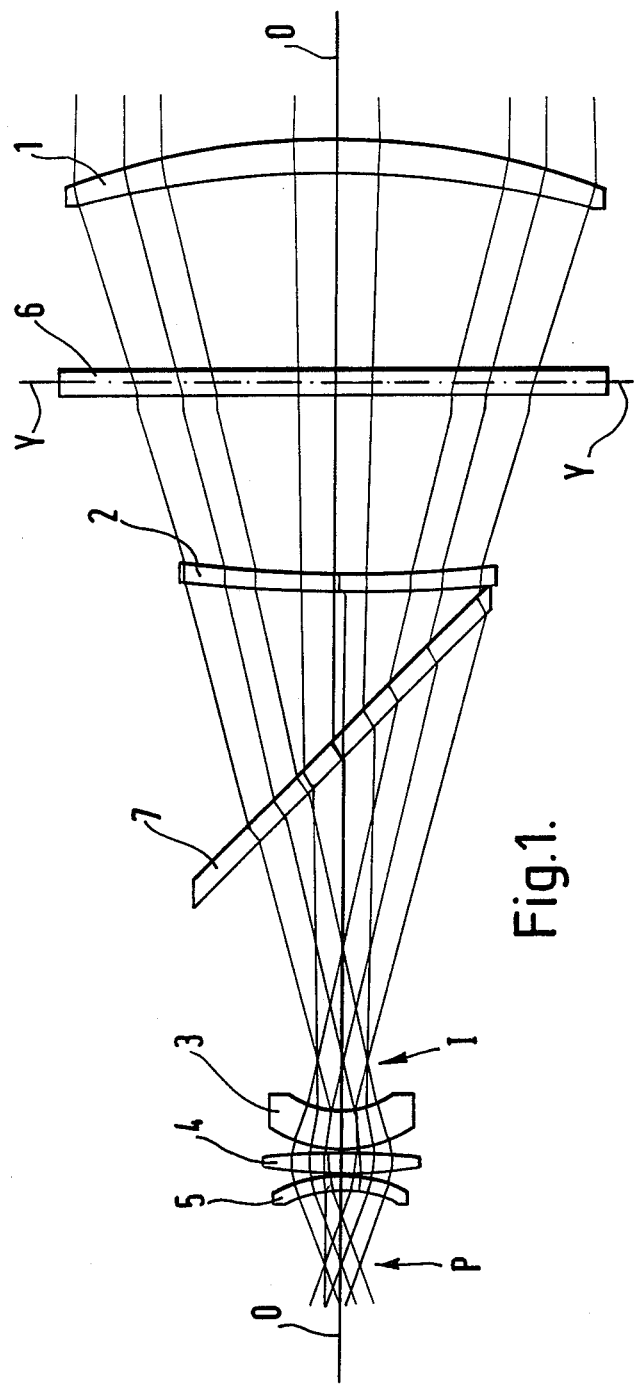
FIG. 1 is a longitudinal section in one plane containing the optical axis of the system.
Figure 2:
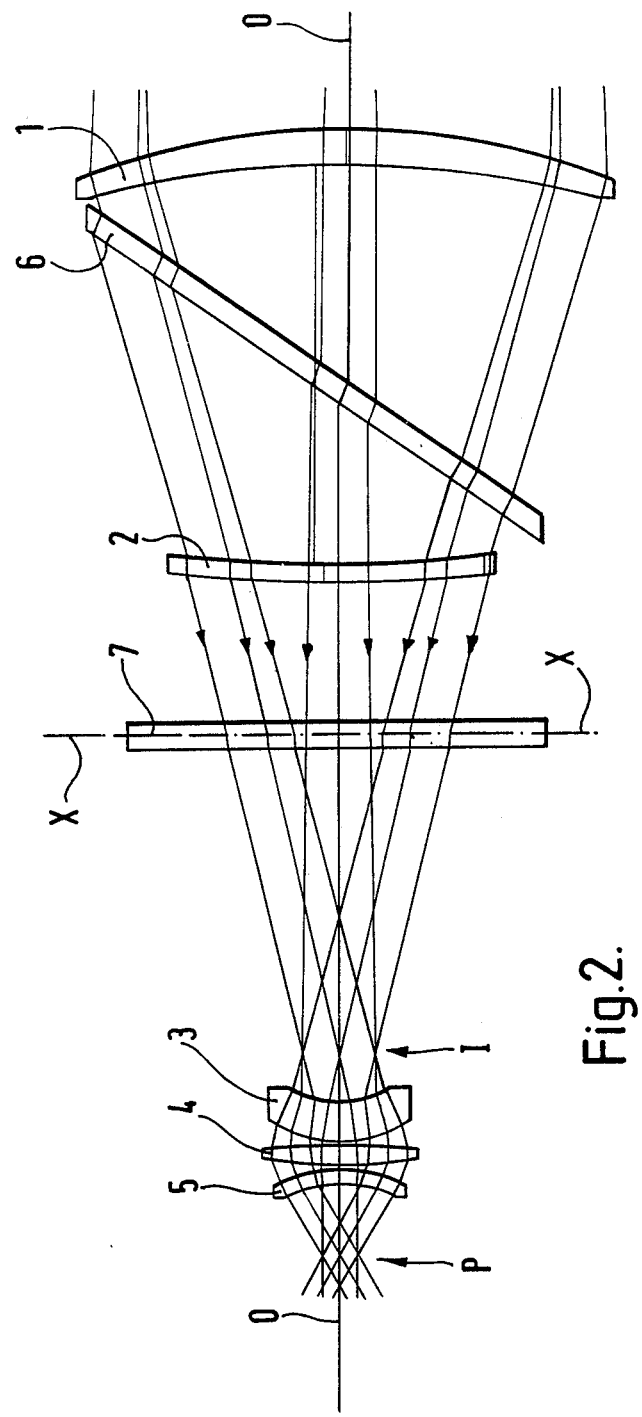
FIG. 2 is a longitudinal section in another plane, orthogonal to that of FIG. 1, containing the optical axis of the system.

The afocal infra-red telescope schematically shown in FIGS. 1 and 2 basically comprises an objective lens having a front lens element 1 and a back lens element 2, and an eye-piece lens having three closely spaced lens elements 3, 4 and 5, the lens elements being arranged along an optical axis 0. All the refracting surfaces of the lens elements are of spherical curvature. The objective lens receives infra-red radiation from a distant scene or object and produces an intermediate image I which is 'viewed' through the eye-piece lens. It will be understood, of course, that the 'viewing' is in practice by means of an infra-red detection system employing a scanner (not shown) operating at an exit pupil P through which collimated radiation from the eye-piece lens passes.

Behind the objective front lens element 1 and between it and the objective back lens element 2 is a beam-splitter plate 6. This consists of a fairly thin (for example between about 5 and 10 mm thick) parallel-faced basically planar substrate which carries on its front face a partially reflecting/partially transmitting coating by which some of the radiation can be reflected into a separate channel described later. The beam-splitter plate 6 is tilted with respect to the optical axis 0 (see FIG. 2) being inclined about a first axis Y (FIG. 1) orthogonal to the optical axis 0.

It will be understood that, with FIGS. 1 and 2 being in orthogonal planes, the axis Y lies in the plane of FIG. 1 and is orthogonal to the plane of FIG. 2.

An unwanted effect of the beam-splitter plate 6 is to introduce aberration into the radiation beam transmitted through the plate in a manner more fully explained later. To compensate for this a compensating plate 7 is located at the back of the objective lens, i.e. behind the lens element 2 so as to be between that element 2 and the intermediate image I. The compensating plate 7, which is also fairly thin and basically planar parallel-faced, is tilted with respect to the optical axis 0 (see FIG. 1), being inclined about a second axis X (FIG. 2) orthogonal to the optical axis 0. It will be understood that the axis X is orthogonal to the plane of FIG. 1, and lies in the plane of FIG. 2 which is orthogonal to the first axis Y. In other words, the respective axes Y and X about which the plates 6 and 7 are tilted or inclined lie in orthogonal planes effectively containing the optical axis 0, i.e. the planes of FIGS. 2 and 1 respectively. Expressed otherwise, the axes X and Y are at positions spaced along the optical axis 0, to which they are each orthogonal, and are in mutually orthogonal, but non-coplanar, relationship.

An effect of the beam-splitter plate 6 on the radiation transmitted therethrough is effectively to displace the optical axis 0, as can be seen in FIG. 2. Even after appropriately displacing lens components so as to relocate the centres of curvature of the spherical refracting surfaces on the displaced axis, the image will still suffer from astigmatism and coma. Asymmetric chromatic aberration may also be introduced, but this may be at a negligible or at least tolerable level if a low dispersion material such as germanium is employed for the elements.

The purpose of the tilted compensating plate 7 is to introduce aberrations which, at least partially, counter those introduced by the beam-splitter plate 6. With the two plates 6 and 7 located in beam positions having different values of numerical aperture, the amount of spherical aberration generated at each plate will be different. Therefore, at a given angle of inclination, the amount of asymmetrical aberration induced from the spherical aberration will differ in each space. The asymmetrical astigmatism can be compensated by arranging the angles of tilt to be opposed and of a magnitude appropriate to the numerical aperture. Thus, with the beam-splitter plate 6 being at a larger numerical aperture position than the compensating plate 7, then the compensating plate 7 may be tilted with respect to the optical axis to a greater degree than the beam-splitter plate 6. For example, if the beam-splitter plate 6 is set at an angle (between the effective plane of the plate and a plane orthogonal to the optical axis) of about 34°, then the compensating plate 7 may be set at an angle of about 45°. The residual asymmetrical coma can be compensated by appropriate choice of values of decentre of the lens elements 1 and 2. This decentration removes these lens elements from the expected positions determined from the effective displacement of the optical axis by reason of the plate thickness. Generally the overall level of compensation desired is sufficient substantially to restore the image quality to that of a centred system having no tilted plates.

Figure 3:
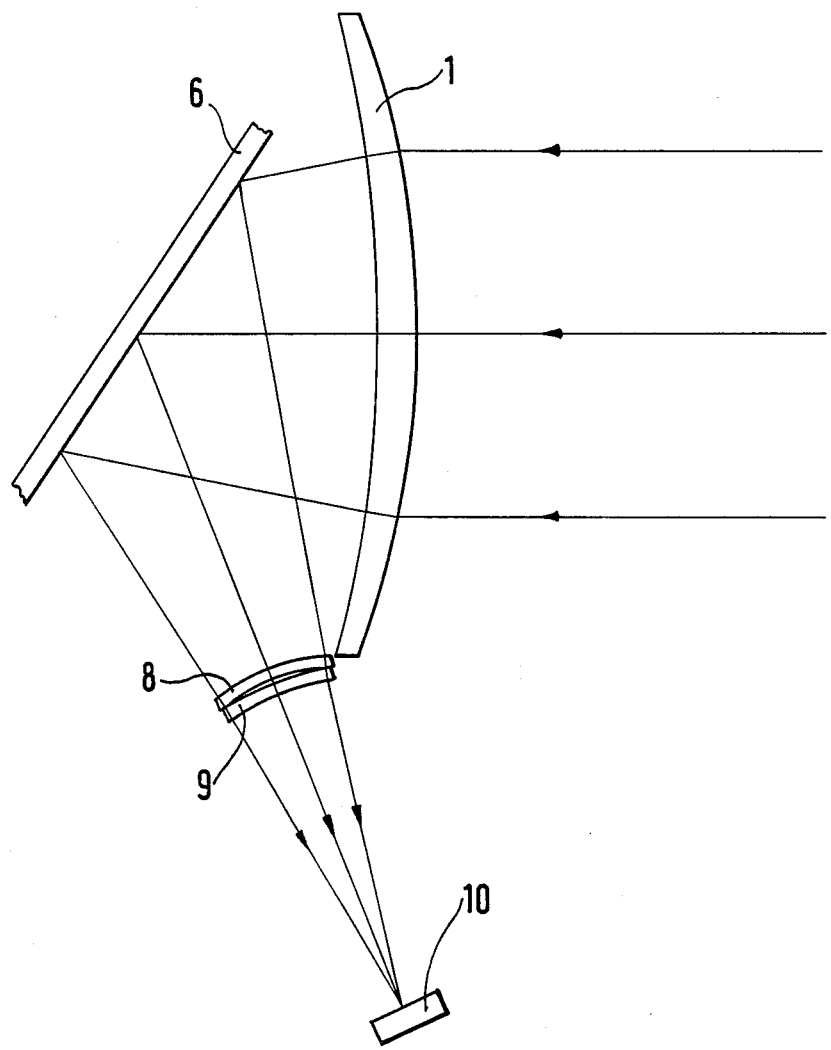
FIG. 3 shows a radiation channel forming part of the system.

FIGS. 1 and 2 show the channel for radiation transmitted through the beam-splitter plate 6, the described compensation being effected in this channel. FIG. 3 schematically shows the channel for radiation reflected from the beam-splitter plate 6. Such radiation, initially transmitted through the objective front lens element 1, is reflected by the coating on the front face of the beam-splitter plate 6 and travels to a pair of lens elements 8 and 9 which focus it to an image on a suitable infra-red detector 10. The lens elements 8 and 9 are located just clear of the main telescope beam and are centred with respect to the telescope front lens element 1 (taking account of the reflection angle). The image produced at the detector 10 in the reflection channel can be effectively monochromatically diffraction limited, and the image quality can be maintained over a few millimetres of image field. Some chromatic correction could be obtained by appropriate choice of material s for the doublet lens elements 8 and 9 but this would not generally be necessary when imaging, for example, a laser wavelength selectively reflected by the coating on the beam-splitter plate 6.

In the specific embodiment shown in FIGS. 1, 2 and 3 the lens elements, whose refracting surfaces are all of spherical curvature, are of the following powers and shapes. Element 1 is a positive meniscus convex to the front, 2 is a negative meniscus concave to the front, 3 is a negative meniscus concave to the front, 4 is a positive biconvex, 5 is a positive meniscus convex to the front, 8 is a positive meniscus convex to the front, and 9 is a negative meniscus convex to the front. These lens elements, and the plates 6 and 7, are each of infra-red transmissive material, i.e. material with a useful spectral bandpass over the operative waveband, and may all be made of the same infra-red transmitting material, which for the thermal infra-red 8 to 12 microns waveband is preferably germanium.

A particular example for the thermal infra-red waveband in accordance with the specific embodiment and employing air-spaced all germanium elements has numerical data as follows. The dimensional units are millimetres but the values are relative and can be scaled accordingly. The refracting surfaces in the main telescope transmission channel (Table I) are indicated from front to back as R1 to R14, and those of lens elements 1, 8 and 9 in the reflection channel (Table II) as R1, R2 and R15 to R18. The main transmission channel constitutes a X13 magnification afocal telescope while the reflection channel constitutes an f/3.2 imaging objective of 330 mm focal length. The lens element 1 is decentred so that the centres of curvature of its surfaces R1 and R2 are displaced relative to an axis through the centres of curvature of surfaces R9 to R14 (lens elements 3, 4 and 5) by −2.231 mm in an X sense (parallel to the X axis) and by 3.542 mm in a Y sense (parallel to the Y axis). The lens element 2 is similarly decentred so that the centres of curvature of its surfaces R5 and R6 are displaced relative to the R9 and R14 centre axis by 1.685 mm in an X sense and 3.987 mm in a Y sense. The beam-splitter plate 6 is tilted at 34° with respect to the optical axis 0 about the Y axis and the compensating plate 7 is tilted at 45° with respect to the optical axis 0 about the X axis (the angles of tilt being measured between the optical axis and a perpendicular to the plate). The germanium of the elements 1 to 9 has (at 20° C.) refractive indices of 4.00510 for 8.25 microns wavelength, 4,00324 for 10 microns wavelength, and 4.00212 for 11.75 microns wavelength, The main transmission channel:

TABLE I

| Surface | Radius of Curvature | Axial Separation | Clear Aperture Diameter |
|---|---|---|---|
| R1 | 253.74 | 11.43 | 174.0 |
| R2 | 359.42 | 63.50 | 170.6 |
| R3 | PLANO | 7.03 | 170.0 |
| R4 | PLANO | 57.85 | 170.0 |
| R5 | −478.26 | 5.69 | 101.9 |
| R6 | −560.94 | 46.29 | 101.9 |
| R7 | PLANO | 6.00 | 110.0 |
| R8 | PLANO | 114.86 | 110.0 |
| R9 | −31.235 | 12.70 | 34.5 |
| R10 | −41.347 | 1.00 | 46.5 |
| R11 | 363.391 | 6.35 | 50.8 |
| R12 | −180.910 | 1.00 | 50.9 |
| R13 | 43.802 | 5.00 | 43.1 |
| R14 | 44.403 | 24.13 | 39.0 |
| P | | | |

The reflection channel:

TABLE II

| Surface | Radius of Cruvature | Axial Separation | Clear Aperture Diameter |
|---|---|---|---|
| R1 | 253.74 | 11.43 | 103.3 |
| R2 | 359.42 | 170.18 | 100.4 |
| R15 | 53.18 | 3.56 | 34.1 |
| R16 | 54.72 | 1.27 | 32.1 |
| R17 | 118.59 | 3.56 | 32.1 |
| R18 | 87.19 | 95.22 | 30.8 |
| IMAGE | | | |

The reflection channel may be required to give different possible fields of view for a given sized detector array 10 and further examples are as follows:

TABLE III

| Surface | Radius of Curvature | Axial Separation | Clear Aperture Diameter |
|---|---|---|---|
| R1 | 253.74 | 11.43 | 157.72 |
| R2 | 359.42 | 170.18 | 154.23 |
| R15 | 53.09 | 3.56 | 50.85 |
| R16 | 55.35 | 5.08 | 48.32 |
| R17 | 105.81 | 3.56 | 46.33 |
| R18 | 74.93 | 94.50 | 43.91 |
| IMAGE | | | |

This example has a focal length of 355,35, the individual elements 1, 8 and 9 having focal lengths of 265.82, 198.59 and −93.59 respectively.

TABLE IV

| Surface | Radius of Curvature | Axial Separation | Clear Aperture Diameter |
|---|---|---|---|
| R1 | 253.74 | 11.43 | 156.85 |
| R2 | 359.42 | 170.18 | 153.35 |
| R15 | 108.39 | 4.01 | 51.39 |
| R16 | 147.50 | 1.52 | 49.81 |
| R17 | 245.73 | 3.31 | 49.09 |
| R18 | 104.75 | 176.61 | 47.15 |

TABLE IV-continued

| Surface | Radius of Curvature | Axial Separation | Clear Aperture Diameter |
|---|---|---|---|
| IMAGE | | | |

This example has a focal length of 598.84, the individual elements 1, 8 and 9 having focal lengths of 265.82, 126.38 and −61.90 respectively.

Further, there may be a requirement for relaying the image in the reflection channel so that this channel also has an intermediate image. The image may be relayed to give access to the focal plane, for example for a graticule or a protection device, and/or the relaying may assist with folded geometry. Examples with a relayed image are as follows:

TABLE V

| Surface | Radius of Curvature | Axial Separation | Clear Aperture Diameter |
|---|---|---|---|
| R1 | 253.75 | 11.43 | 170.25 |
| R2 | 359.42 | 170.18 | 166.82 |
| R15 | 64.32 | 6.27 | 55.03 |
| R16 | 67.07 | 5.08 | 50.61 |
| R17 | 131.68 | 3.56 | 48.12 |
| R18 | 84.96 | 179.77 | 45.75 |
| R19 | −204.35 | 4.57 | 47.47 |
| R20 | −120.90 | 1.00 | 48.52 |
| R21 | 72.96 | 4.57 | 48.34 |
| R22 | 127.00 | 2.54 | 46.95 |
| R23 | 184.01 | 3.35 | 45.15 |
| R24 | 125.55 | 75.85 | 43.51 |
| FINAL IMAGE | | | |

The intermediate image is formed between surfaces R18 and R19, and surfaces R19 to R24 represent the relay lens which, in this example, is a three element lens having a front positive meniscus element concave to the front, a middle positive meniscus element convex to the front, and a back negative meniscus element convex to the front. This example has a focal length of −355,39 with the individual elements from front to back having respective focal lengths of 265.82, 192.93, −84.56, 94.71, 53.70 and −137.51.

TABLE VI

| Surface | Radius of Curvature | Axial Separation | Clear Aperture Diameter |
|---|---|---|---|
| R1 | 253.74 | 11.43 | 157.34 |
| R2 | 359.42 | 170.18 | 153.84 |
| R15 | 53.55 | 3.56 | 49.70 |
| R16 | 54.79 | 3.81 | 47.11 |
| R17 | 145.32 | 3.56 | 46.77 |
| R18 | 99.69 | 183.27 | 44.85 |
| R19 | −167.03 | 5.08 | 41.62 |
| R20 | −111.37 | 1.00 | 42.92 |
| R21 | 106.90 | 5.08 | 43.15 |
| R22 | 145.48 | 147.26 | 41.85 |
| FINAL IMAGE | | | |

The intermediate image is again formed between surfaces R18 and R19, and surfaces R19 to R22 represent the relay lens which, in this example, has two elements, namely a front positive meniscus element concave to the front and a back positive meniscus element convex to the front. This example has a focal length of −600.70, the individual elements from front to back having respective focal lengths of 265.82, 249.86, −112.32, 104.18 and 122.16.

It will be understood that this data, and the specific embodiment, are given by way of illustration and example and that other embodiments and examples within the scope of the invention may be devised.

While germanium is a convenient and preferable material for the elements, other materials could be employed. Germanium permits good image quality to be obtained, substantially free of chromatic aberration, because of its low inherent chromatic dispersion. However, a small improvement in image quality may be achieved by sharing the power contribution of the lens element 2 between two lens elements of differing chromatic dispersions arranged to further correct the chromatic aberration. Also, different materials from germanium may be desirable for operation in a waveband other than the thermal infra-red, for example in the 3 to 5 micron waveband. Further, although the elements are conveniently air spaced, some other gas might conceivably be employed.

Other forms of objective and eye-piece lenses could be used in the telescope, and the invention can be applied to infra-red optical systems other than telescopes. While lens elements of spherical curvature are generally desirable, the system could involve one or more aspheric surfaces if required.

The disposition of the beam-splitter and compensating plates may be changed from that specifically shown and described. Notably, while it has been found that the compensation is better with the beam-splitter and compensating plates tilted about mutually orthogonal axes, some compensation may be achieved with the plates tilted about parallel or mutually skewed axes. Also the compensating plate may be located in the system forwardly of the beam-splitter plate so that the radiation is transmitted through the compensating plate before the beam-splitter plate; thus in FIGS. 1 and 2 element 6 could constitute the compensating plate and element 7 could constitute the beam-splitter plate, it then being provided with a suitable partially reflective coating on its front face. In this case residual aberrations of the objective lens, which in the main transmission channel are corrected by the re-collimating optics constituting the eye-piece lens, could be similarly corrected by optics in the reflection channel involving the plate 7. If desired both the plates 6 and 7 could serve a beam-splitting function so as to provide two separate reflection channels, each plate then constituting a beam-splitter and a compensator for the other plate. If necessary an additional tilted plate may be introduced in the reflection channel or channels to provide compensation so as to ensure adequate image quality, or possibly a rear surface reflector could be used for the reflected beam.

While described above as operating in beam dividing mode, the beam-splitter plate could perform a beam combining function. Thus in FIGS. 1 and 2 the plate 7 could be suitably coated on its back fact to make it a beam-splitter and a radiation beam could be injected so as to be reflected from that face and combine with the main beam transmitted through the plate, the projection optics for the injected beam being arranged to provide appropriate aberration balancing relative to residual aberrations in the main beam from the objective lens. Alternatively, or additionally, the forward plate 6 could have its rear face suitably coated to effect reflection of an injected radiation beam to combine it with the main beam transmitted through the plate. The terms 'beam-splitter', 'beam splitting' and the like are, of course, to be understood as comprehending division of a radiation beam and/or combination of radiation beams.

The degrees of tilt of the beam-splitter and compensating plates are generally selected to achieve optimal aberration compensation in the particular system. It will be appreciated, however, that too steep an angle of tilt can cause high order aberrational problems, and generally angles (between a normal to the effective plane of the plate and the optical axis) of about 34° for the first plate and about 45° for the second are preferred. If the angle of tilt of the first plate is increased to 45° then the second needs to be increased to about 55° and the high order aberration introduced by the very steep angles of incidence then encountered can seriously affect the transmitted image quality. An angle of tilt for the first plate which keeps the angles of incidence to an acceptable value consistent with appropriate geometry for the reflected beam is therefore desirable. The clear aperture of the front lens element has some effect on this geometry. An angle of tilt of the first plate which is around 34° has been found to allow adequate clearance of the reflected beam in the described embodiment.

The plates are conveniently and preferably basically planar, i.e. have substantially parallel and planar faces. However, some departure from exact parallelism and/or exact planarity may be acceptable in some circumstances; for example one or both faces may have a degree of curvature. The partially reflective coating on the beam-splitter plate or plates may be of a neutral type such that a proportion of the same radiation wavelengths travels along each channel. It may, however, have wavelength selective reflection/transmission characteristics and the infra-red optical system can be a dual waveband system in which one waveband (e.g. 8-12 microns) travels along the transmission channel and the other waveband (e.g. 3-5 microns) travels along the reflection channel. The materials of the elements in the respective channels are, of course, transmissive to the respective wavebands, and elements common to both channels (like lens element 1 in FIGS. 1 and 2) are of a material transmissive to both wavebands. One of the wavebands could be visible, the partially reflective coating being such as to reflect the visible light and transmit the infra-red radiation, the optical elements in the reflection channel then being transmissive to the visible light and any element common to both channels being of a material, such as visually transmissive zinc sulphide, which transmits both the infra-red and the visible wavebands. In this context it will be understood that the expression 'infra-red optical system' comprehends, as well as systems which operate only with infra-red radiation, systems which involve operation with both infra-red and other, e.g. visible, wavebands.

I claim:

1. An infra-red optical system having an optical axis and comprising:

a beam-splitter plate located in a beam position having one value of numerical aperture and being tilted with respect to the optical axis of the system; and, a single compensating plate located in a beam position having another and different value of numerical aperture and being tilted with respect to the optical axis of the system differently from the beam-splitter plate, wherein the manner in which the compensating plate is tilted differently from the tilted beam-splitter plate is such as to compensate at least partially for aberrations introduced by the tilted beam-splitter plate.

2. An optical system according to claim 1 in which the beam-splitter plate is inclined with respect to the optical axis about a first axis orthogonal to the optical axis, and the compensating plate is inclined with respect to the optical axis about a second axis orthogonal to the optical axis and lying in a plane orthogonal to said first axis.

3. An optical system according to claim 1 wherein said optical system is an afocal telescope having an objective lens.

4. An optical system according to claim 3 in which the beam-splitter plate is located behind a front lens element of the objective lens of the telescope.

5. An optical system according to claim 4 in which the beam-splitter plate is located between lens elements of the objective lens of the telescope.

6. An optical system according to claim 3 in which the compensating plate is located at the back of the objective lens of the telescope.

7. An optical system according to claim 1 having lens elements whose refracting surfaces are all of spherical curvature.

8. An optical system according to claim 1 having at least one lens element decentered to assist with the compensation.

9. An optical system according to claim 8 having lens elements whose refracting surfaces are all of spherical curvature.

* * * * *